Dec. 5, 1944.  F. H. REICHEL  2,364,552
PROCESS AND APPARATUS FOR PRODUCING PELLICLES
Filed Nov. 14, 1942
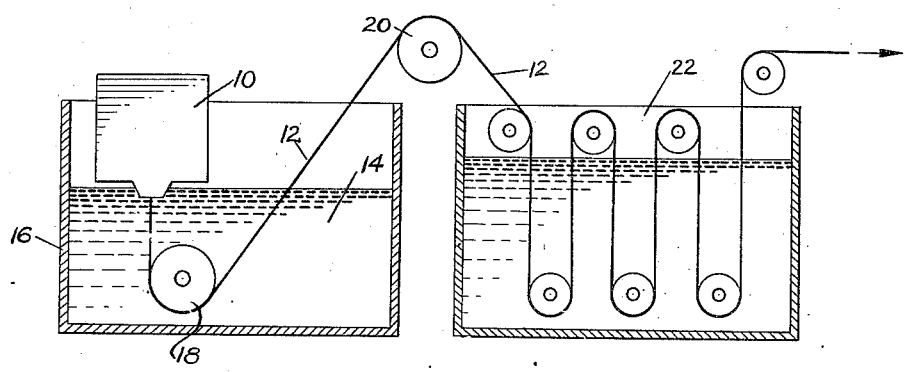
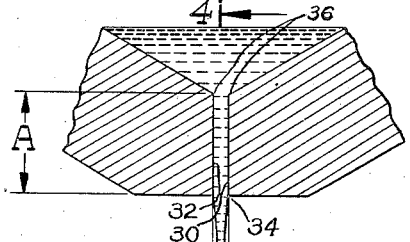
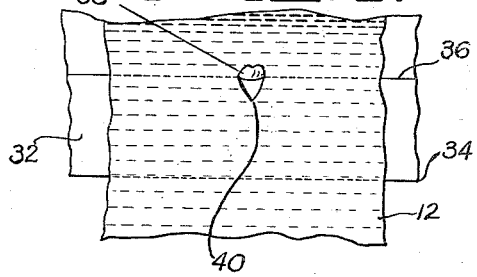
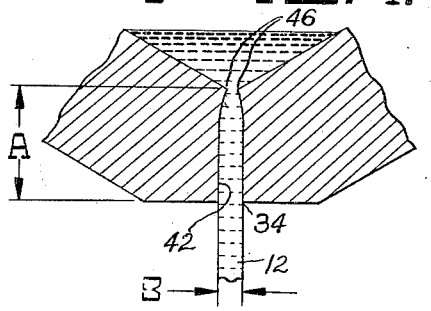
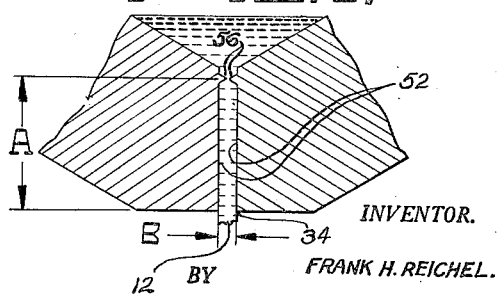
INVENTOR.
FRANK H. REICHEL.
BY John L. Osmer
ATTORNEY.

Patented Dec. 5, 1944

2,364,552

UNITED STATES PATENT OFFICE 2,364,552

PROCESS AND APPARATUS FOR PRODUCING PELLICLES

Frank H. Reichel, Fredericksburg, Va., assignor to Sylvania Industrial Corporation, Fredericksburg, Va., a corporation of Virginia Application November 14, 1942, Serial No. 465,565

5 Claims. (Cl. 18—15)

The present invention relates to the art of extrusion. More particularly, it relates to a process for extruding pellicles from flowable material in the form of solutions or dispersions of film-forming substances.

The present application is a continuation-in-part of my co-pending application Serial No. 310,559, filed December 22, 1939.

Pellicles are usually formed from film-forming material by extruding dispersions of such material from a suitable container through a slit-like orifice into a hardening bath which coagulates the flowable film-forming material and sets it in the shape of a pellicle. The flowable material frequently contains particles of extraneous matter or particles of solid material from which the flowable solution is made. In the formation of pellicles heretofore, these particles have frequently become lodged in the orifice, with the result that the solution flowing around each particle is divided into two separate streams and when these separate streams are hardened into a pellicle a slit-like division occurs along the entire length of the pellicle which is of substantially the same width as the particle. Numerous efforts have been made to overcome this problem by placing orifice cleaners in each container to avoid the necessity for completely closing down the operation of the machine in order to remove any stoppage in the orifice caused by lodged particles. This has resulted in only a partial solution to the problem since each time particles become lodged in the orifice, it becomes necessary to break the run of the pellicle being formed in order to clean the orifice, with attendant loss of time, interruption of production and wastage of materials.

It is an object of the present invention to provide a process of forming pellicles in which stoppages due to particles becoming lodged in the casting orifice are avoided.

It is another object of the present invention to provide an apparatus for forming pellicles which prevents particles from obstructing the orifice.

It is a further object of the present invention to provide a process and apparatus for producing pellicles by extrusion in which the presence of particles in the pellicle-forming solution does not produce slits or divisions in the pellicle.

It is a still further object of the present invention to provide a method and apparatus for rapidly forming pellicles from flowable material in an economical manner.

Other objects will in part be obvious and will in part appear hereinafter.

According to the present invention pellicles are formed by extruding a liquid material through an elongate opening defined by opposing walls which are no closer together at any point than the entrance of the opening, and preferably where the width of the opening is between 0.004 and 0.02 of an inch and the depth of the opening is between 0.25 and 0.50 of an inch, discharging the solution in an unbroken stream into a coagulating solution to form an unbroken pellicle, whereby the viscose solution reforms itself into an unbroken stream after passing any particle which breaks the stream in the opening.

In an embodiment, the process comprises passing the liquid material through a constricted opening, flowing the material beyond the constricted opening between opposing wall surfaces which are farther apart than the distance across the constricted opening, but are sufficiently close together to cause the liquid material after flowing around any object lodged in the constricted opening to again flow into an unbroken stream.

The apparatus of the invention comprises an extrusion nozzle combining an elongate extrusion orifice defined by opposing walls which are no closer together at any point than at the entrance of the orifice. For viscose, the space between the walls preferably lies between 0.004 and 0.02 of an inch, and the depth of the walls is between 0.25 and 0.5 of an inch. In an embodiment the orifice has a constriction at a point spaced from the point of discharge of the orifice whereby the liquid material is caused to reform below particles lodged at the constriction and flow from the orifice in an unbroken stream. Suitable means are provided for hardening the broken stream in the shape of a pellicle.

In the preferred embodiment of the invention, the flowable material comprises a viscose solution capable of being extruded through the orifice to form a pellicle of regenerated cellulose. Viscose solutions ordinarily extruded have a viscosity of about 40 centipoises. The pressures normally available for extruding such solutions vary between 20 to 100 pounds per square inch.

The expression "depth of the walls" as used in the specification and claims, is intended to designate the vertical distance from the point of discharge of the liquid material from the orifice to the point of narrowest constriction within the orifice and is illustrated in the drawing by the distance A. The expression "width of the opening" is intended to designate the horizontal distance across the orifice at the point of discharge of liquid material therefrom which width is illustrated in the drawing by distance B.

It has been found that for the conditions under which viscose is extruded commercially, the depth A may lie between 0.25 and 0.50 inch, and the width B may lie between 0.004 and 0.02 inch, that is, if the depth A is 0.25 inch the width B may be approximately 0.004 to 0.01 inch but not substantially less than 0.004 inch. If the depth A is 0.50 inch then the width B may be approximately 0.012 to 0.02 inch, but not substantially greater than 0.02 inch.

When the opening has a depth greater than 0.5 or a width less than 0.004 an excessive pressure is built up in the extrusion nozzle which is impractical for commercial operation under present conditions and with air pressures normally available with present equipment. However, if the depth is less or the width greater than indicated above there will be such a decrease in the pressure on the liquid within the orifice that the broken stream will not be forced to flow together into an unbroken stream after passing a particle lodged in the orifice.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

In the drawing,

Fig. 1 is a diagrammatic view, partly in section, of a casting apparatus constructed in accordance with the present invention;

Fig. 2 is a diagrammatic view of an enlarged fragmentary section of a casting orifice constructed in accordance with the present invention;

Fig. 3 is a fragmentary diagrammatic sectional view of the casting orifice illustrated in Fig. 2, taken substantially along the plane indicated by the line 4—4 and looking in the direction of the arrows;

Fig. 4 is an enlarged diagrammatic fragmentary sectional view of a casting orifice constructed in accordance with a modification of the invention, and Fig. 5 is an enlarged fragmentary sectional view of a casting orifice constructed in accordance with another modification of the present invention.

The present invention is applicable to the formation of pellicles in the form of sheets, tubes and the like from any suitable material, in addition to viscose, for example, such as that from which pellicles are being formed at the present time. Suitable materials are, for example, cellulose derivatives, such as cellulose esters, cellulose ethers, cellulose ether-esters; synthetic resins, such as copolymers of vinyl acetate and vinyl chloride, urea-formaldehyde and phenol-formaldehyde condensation products, methacrylic acid ester resins, and the like; natural resins, casein, gelatin and other suitable film-forming substances.

The material from which the pellicle is to be formed is usually formed into a solution or suspension of suitable fluidity by regulation of the amount of solvent used relative to the amount of solid material. The only requirement is that the film-forming material have sufficient fluidity to be capable of being caused by the wall areas beyond the constricted point to flow into an undivided stream. It will be understood that the solvents used will vary in accordance with the materials used. Any of the well known solvents used in connection with the aforementioned materials for the production of pellicles may be used in the practice of the present invention.

For the purpose of illustration, and not by way of limitation, the present invention will be described as being used in connection with viscose as the pellicle-forming material. The viscose is supplied to a container, usually called a "hopper," such as that diagrammatically illustrated at 10 in Fig. 1. The viscose is cast through a slit-like orifice provided in the container 10, usually at the bottom, in the form of a pellicle 12. The viscose passes from the container 10 directly into a hardening solution 14 within a tank 16 and is coagulated by the solution 14 and fixed in the form of a pellicle. The solution 14 may be of any of the well known coagulating solutions for viscose, for example, an aqueous solution of sulphuric acid. The pellicle 12 is passed around the roller 18 suitably journaled in the tank 16 and is then passed out of the tank and over a roller 20 from which it is passed into a tank 22 for further treatment in accordance with well known practices which in and of themselves form no part of the present invention, and will not be described in detail.

The slit-like or elongated casting orifice heretofore used has been formed with relatively thin walls, the most restricted point being at the point of discharge. The pellicle-forming material frequently contains particles of extraneous matter or particles of undispersed alkali cellulose which will lodge in the orifice opening. As a result of this partial stoppage of flow of the film-forming material the stream is divided at the point of discharge into two separate streams which do not come together again beyond the orifice, thus forming a slit-like division extending the length of the pellicle. This has resulted in considerable loss of time and other expense since a pellicle having such a division is usually not satisfactory for commercial use and discontinuance of operation of a machine is time-consuming and wasteful of material because drainage of the machine is necessary before the orifice can be thoroughly cleaned, and much time and material are wasted in starting up operations of a casting machine due to the difficulty always encountered in threading the pellicle through the various apparatus required for processing.

In accordance with the present invention the orifice 30 is provided with opposed walls and the distance along each wall 32 from the terminus 34 of the orifice to some point thereabove is made appreciable so that the flowable material is forced to pass between opposed wall surfaces just prior to being discharged from the orifice. In the modification illustrated in Fig. 2, the opposed walls 32 are substantially parallel, which causes the edges 36 at the entrance of the orifice to act as a constriction which intercepts all particles contained within the pellicle-forming material of sufficient size to become lodged within the orifice. Referring to Fig. 3 in which a particle 38 is shown lodged in the constriction formed by the edges 36, the pellicle-forming material is shown as flowing around the particle 38 and due to the lateral restraint imposed on the flowing material by the opposed wall surfaces 32 is caused to flow longitudinally of the orifice so that the divided streams come together at a point substantially such as that indicated at 40, and thereby form an unbroken stream which discharges eventually into the coagulating liquid 14 and is hardened into the undivided pellicle 12.

If desired, the wall surfaces 32 may taper outwardly away from the edges 36 provided the taper is not sufficiently great to prevent the orifice from being substantially filled with flowable material at all times. If desired, the constriction point and the wall sections may be separated to any extent desired as by forming in effect a double orifice, one part of which contains the constriction and the other part of which contains the wall areas. The constriction and opposed walls may take many different forms as long as opposed wall areas are provided ahead of the discharge point which are no closer together than the constriction positioned ahead thereof relative to the direction of flow of the pellicle material.

A modified form of the orifice of the present invention is illustrated in Fig. 4 in which the constriction 46 consists of substantially straight wall sections of the orifice and the opposed wall sections which cause the flowable material to flow into a single stream are provided by the curved wall areas 42.

Another modified form of the orifice of the present invention is illustrated in Fig. 5 in which the constriction 56 is formed by projections extending inwardly into the orifice opening and the opposed wall areas 52 extend therebelow either substantially parallel, tapered or curved, as desired.

The present invention has made it possible to operate tube, sheet and other pellicle-forming machines for protracted periods of substantially indefinite duration without the occurrence of division slits in the pellicles due to the presence of particles in the pellicle-forming material. The particles which are lodged at the constriction points merely remain there, if they are not dislodged by the flow of the film-forming material, until such time as the casting equipment is normally cleaned and at this time all particles removed.

Since certain changes in carrying out the above process and in the constructions set forth which embody the invention may be made without departing from its scope, it is intended that all matter contained in the above description or shown in the accompanying drawing shall be interpreted as illustrative and not in a limiting sense.

The invention having been described, what is claimed is:

1. The method of forming pellicles from viscose solutions comprising extruding said solution through an extrusion nozzle defined by an elongate orifice having opposing wall surfaces which are parallel at the discharge point of said nozzle, the distance across the entrance of said orifice being at most that of the distance between said walls at the discharge point, the distance between the walls at the discharge point being between 0.004 and 0.02 inch and the depth of the walls being between 0.25 and 0.50 inch, discharging the solution from the orifice in an unbroken stream and coagulating said solution to form an unbroken pellicle, whereby the solution re-unites into an unbroken stream after passing any particle lodged in the orifice.

2. The method of forming pellicles from viscose solutions comprising extruding said solution through an extrusion nozzle defined by an elongate orifice having opposing wall surfaces which are parallel at the discharge point of said nozzle, the distance across the entrance of said orifice being at most that of the distance between said walls at the discharge point, the distance between the walls at the discharge point being approximately 0.007 inch and the vertical distance of the walls in said entrance to the point of discharge of said solution being approximately 0.25 inch, where the viscosity of the viscose solution is approximately 40 centipoises and where the average pressure of the extruded solution is approximately 30 pounds per square inch, discharging the solution from the orifice in an unbroken stream under the surface of a coagulating solution to form an unbroken pellicle, whereby the viscose solution re-unites into an unbroken stream after passing any particle lodged in the orifice.

3. In an apparatus for forming pellicles from a liquid material, an extrusion nozzle comprising an elongate orifice having opposing wall surfaces, the distance across the entrance of said orifice being at most that of the distance between said walls at the discharge point, the distance between said walls at the discharge point being between 0.004 and 0.02 inch and the depth of the walls being between 0.25 and 0.50 inch, whereby the liquid material is caused to reform and flow from the discharge point of the orifice in an unbroken stream after passing any particle lodged in the orifice.

4. In an apparatus for forming pellicles from viscose solutions, an extrusion nozzle defined by an elongate orifice having opposing wall surfaces which are parallel at the discharge point of said nozzle, the distance across the entrance of said orifice being at most that of the distance between said walls at the discharge point, the distance between the walls at the discharge point being between 0.004 and 0.02 inch and the depth of the walls being between 0.25 and 0.50 inch, whereby the viscose solution is caused to re-unite and flow from the orifice in an unbroken stream into a coagulating bath for the viscose solution after passing any lodged particle which breaks the stream in the orifice.

5. In an apparatus for forming pellicles for viscose solutions, an extrusion nozzle defined by an elongate orifice having opposing wall surfaces which are parallel at the discharge point of said nozzle, the distance across the entrance of said orifice being at most that of the distance between said walls at the discharge point, the distance between said walls at the discharge point being at least 0.007 inch and the depth of the walls being approximately 0.25 inch, whereby the viscose solution is caused to re-unite and flow from the orifice in an unbroken stream into a coagulating bath for the viscose solution after passing any lodged particle which breaks the stream in the orifice.

FRANK H. REICHEL.